(12) United States Patent
Zhang et al.

(10) Patent No.: US 9,607,614 B2
(45) Date of Patent: Mar. 28, 2017

(54) TERMINAL, SERVER AND INFORMATION PUSHING METHOD

(71) Applicants: Yulong Computer Telecommunication Scientific (Shenzhen) Co., Ltd., Shenzhen, Guangdong (CN); Dongguan Yulong Telecommunication Tech Co., Ltd., Dongguan, Guangdong (CN)

(72) Inventors: Heng Zhang, Guangdong (CN); Xianyong Hou, Guangdong (CN); Caiyan Ma, Guangdong (CN)

(73) Assignees: Yulong Computer Telecommunication Scientific (Shenzhen) Co., Ltd., Shenzhen, Guangdong (CN); Dongguan Yulong Telecommunication Tech Co., Ltd., Dongguan, Guangdong (CN)

( * ) Notice: Subject to any disclaimer, the term of this patent is extended or adjusted under 35 U.S.C. 154(b) by 0 days.

(21) Appl. No.: 14/425,291

(22) PCT Filed: Sep. 20, 2012

(86) PCT No.: PCT/CN2012/081683
§ 371 (c)(1),
(2) Date: Mar. 2, 2015

(87) PCT Pub. No.: WO2014/043880
PCT Pub. Date: Mar. 27, 2014

(65) Prior Publication Data
US 2015/0221301 A1    Aug. 6, 2015

(51) Int. Cl.
*G10L 15/08* (2006.01)
*G10L 15/26* (2006.01)
*H04W 88/02* (2009.01)

(52) U.S. Cl.
CPC .............. *G10L 15/08* (2013.01); *G10L 15/26* (2013.01); *H04W 88/02* (2013.01); *G10L 2015/088* (2013.01); *H04M 2201/40* (2013.01)

(58) Field of Classification Search
USPC ....................... 704/251–257, 270.1
See application file for complete search history.

(56) References Cited

U.S. PATENT DOCUMENTS 6,529,864 B1 * 3/2003 Chase ................. G06F 17/2775
704/9
2007/0136274 A1 * 6/2007 Takuma .............. G06F 17/3061
(Continued)

FOREIGN PATENT DOCUMENTS

| CN | 101473636 A | 7/2009 |
| CN | 101931701 A | 12/2010 |
| CN | 102262665 A | 11/2011 |

*Primary Examiner* — Abul Azad
(74) *Attorney, Agent, or Firm* — Rudy J. Ng; Bret E. Field; Bozicevic, Field & Francis LLP (57) ABSTRACT

The present invention provides a terminal, comprising: a voice recognition unit for recognizing a voice during a call and generating recognition data; a first acquisition unit connected to the voice recognition unit and used for acquiring information correlated with the recognition data; and a display unit connected to the first acquisition unit and used for displaying the correlated information. The present invention also provides a server and an information pushing method. Through the technical schemes of the present invention, information correlated with the call content can be automatically and rapidly acquired according to the call content and presented to a user, thus facilitating timely referring of the user.

15 Claims, 5 Drawing Sheets

(56) References Cited

U.S. PATENT DOCUMENTS

| | | | |
|---|---|---|---|
| 2007/0249406 A1* | 10/2007 | Andreasson | H04M 1/656 455/563 |
| 2008/0195505 A1* | 8/2008 | Kirkpatrick | G06Q 10/087 705/26.8 |
| 2009/0327263 A1 | 12/2009 | Maghoul | |
| 2013/0065648 A1* | 3/2013 | Kim | G06F 21/31 455/566 |

* cited by examiner

Fig. 8B

TERMINAL, SERVER AND INFORMATION PUSHING METHOD

FIELD OF THE INVENTION

The present invention relates to the technical field of communications, and particularly relates to a terminal, a server and an information pushing method.

BACKGROUND OF THE INVENTION

In a call between a user and someone else, themes or some hot words of user's interest may exist. If the user wants to query related information of the words of interest after the call, these words of interest need to be input first for a query operation, and then the related information may be queried, so that the operation is fussy, and the information of the related words may not be timely learnt in the call process of the user or after the call.

Therefore, a new information pushing technology is needed, for automatically and rapidly acquiring information related to the call content according to the call content and presenting the information to a user, thus facilitating timely referring of the user.

SUMMARY OF THE INVENTION

Based on the above problems, the present invention provides an information pushing technology, for rapidly acquiring information related to the call content and presenting the information to a user, thus facilitating timely referring of the user.

In view of this, the present invention provides a terminal, including: a voice recognition unit for recognizing a voice during a call and generating recognition data; a first acquisition unit connected to the voice recognition unit and used for acquiring information correlated with the recognition data; and a display unit connected to the first acquisition unit and used for displaying the correlated information.

In this technical scheme, the terminal may automatically recognize the call voice and acquire the correlated information according to the recognized data, wherein the call may be a double-party call or a multi-party call (e.g. teleconference), so that a user may acquire related data of the call content in the first time after the call or during the call, the search time is saved for the user, and call parties may timely learn the condition of related content and acquire beneficial information when a certain theme is discussed, e.g. a teleconference, thus contributing to the progress of the conference. In the above technical scheme, preferably, the first acquisition unit includes: a first extraction subunit for extracting hot words and/or high-frequency words of which the appearance frequency reaches a preset frequency from the recognition data; and a first retrieval subunit for retrieving information correlated with the hot words and/or the high-frequency words.

In this technical scheme, the hot words are current popular words, the high-frequency words are the ones of which the appearance frequency is high in the call, these words are most likely the theme or keywords of the current call content, and the query requirement of a user for the current call content may most likely be met by retrieving these words and acquiring the correlated information.

In the above technical scheme, preferably, the first extraction subunit compares the words in the recognition data with words in a hot word bank, and extracts the same words therefrom to serve as the hot words.

In this technical scheme, the hot words may be acquired by comparing the words in the recognition data with the words in the hot word bank, wherein the hot word bank may be updated in real time.

In the above technical scheme, preferably, the first acquisition unit further includes: a first comparison subunit for comparing the high-frequency words with words in a preset word bank; and a first deletion subunit for deleting the same words from the high-frequency words according to the comparison result of the first comparison subunit, to push the information correlated with the reserved high-frequency words.

In this technical scheme, besides the theme, the words with high appearance frequency in the call content may include modal particles, personal pronouns, conjunctions and the like, and these words are not the ones which need to be queried by a user. Thus, a preset word bank may be set for storing common or familiar words. After the high-frequency words in the call content are acquired, the high-frequency words are compared with the words in the preset word bank, and if the comparison result is identical, it indicates that the high-frequency words are common or familiar words, these common or familiar words are deleted from the high-frequency words, and only the remaining high-frequency words are retrieved, so that the retrieval workload may be reduced and the processing efficiency of a system may be improved. According to another aspect of the present invention, also provided is a terminal, including: a voice recognition unit for recognizing a voice during a call and generating recognition data; a first transceiving unit connected to the voice recognition unit and used for transmitting the recognition data to a server and receiving information returned by the server; and a display unit connected to the first transceiving unit and used for displaying the information from the server.

In this technical scheme, the terminal may recognize the call voice and upload the recognized data to the server.

In the above technical scheme, preferably, the first transceiving unit is also used for transmitting a recognition code of other terminal making a call with the terminal to the server.

According to yet another aspect of the present invention, also provided is a server, including: a second transceiving unit for receiving recognition data transmitted by a terminal, and transmitting correlated information acquired by a second acquisition unit to the terminal; and the second acquisition unit connected to the second transceiving unit and used for acquiring the information correlated with the recognition data.

In this technical scheme, the server is matched with the above-mentioned terminal and may acquire the correlated information according to the recognition data of the terminal, wherein the call may be a double-party call or a multi-party call (e.g. teleconference), so that a user may acquire related data of the call content in the first time after the call or during the call, the search time is saved for the user, and the user experience is improved.

In the above technical scheme, preferably, the second acquisition unit includes a second extraction subunit connected to a second retrieval subunit and used for extracting hot words and/or high-frequency words of which the appearance frequency reaches a preset frequency from the recognition data; and the second retrieval subunit connected to the second transceiving unit and used for retrieving information correlated with the hot words and/or the high-frequency words.

In this technical scheme, the hot words are current popular words, the high-frequency words are the ones of which the appearance frequency is high in the call, these words are most likely the theme or keywords of the current call content, and the query requirement of a user for the current call content may most likely be met by retrieving these words and acquiring the correlated information.

In the above technical scheme, preferably, the second extraction subunit compares the words in the recognition data with words in a hot word bank, and extracts the same words therefrom to serve as the hot words.

In this technical scheme, the hot words may be acquired by comparing the words in the recognition data with the words in the hot word bank, wherein the hot word bank may be updated in real time.

In the above technical scheme, preferably, the second acquisition unit further includes: a second comparison subunit for comparing the high-frequency words with words in a preset word bank; and a second deletion subunit for deleting the same words from the high-frequency words according to the comparison result of the second comparison subunit, to push the information correlated with the reserved high-frequency words.

In this technical scheme, besides the theme, the words with high appearance frequency in the call content may include modal particles, personal pronouns, conjunctions and the like, and these words are not the ones which need to be queried by a user. Thus, a preset word bank may be set for storing common or familiar words. After the high-frequency words in the call content are acquired, the high-frequency words are compared with the words in the preset word bank, and if the comparison result is identical, it indicates that the high-frequency words are common or familiar words, these common or familiar words are deleted from the high-frequency words, and only the remaining high-frequency words are retrieved, so that the retrieval workload may be reduced and the processing efficiency of a system may be improved. In any above technical scheme, preferably, the second transceiving unit is also used for receiving a recognition code of other terminal making a call with the terminal from the terminal, the server further includes a judgment unit for judging the other terminal making a call with the terminal according to the recognition code transmitted by the terminal, and the second transceiving unit transmits the correlated information to the other terminal.

In this technical scheme, because both the user terminal and the other terminal making a call with the user terminal may upload the recognition data to the server, the server needs to respectively retrieve the correlated information from the recognition data uploaded by the different terminals, actually only one-time retrieval is needed, and then the server respectively transmits the retrieval result to of the multiple terminals in the call.

Thus, in order to reduce the computational burden of the server, the other terminal making a call with the user terminal may be determined by recognizing the recognition code transmitted by the user terminal, then the recognition data from the user terminal and the other terminal is retrieved only once, and the retrieval result is respectively transmitted to the user terminal and the other terminal.

According to still another aspect of the present invention, also provided is an information pushing method, including: recognizing a voice during a call and generating recognition data; and acquiring information correlated with the recognition data and pushing the information to a user.

In this technical scheme, a terminal may automatically recognize the call voice and acquire the correlated information according to the recognized data, wherein the call may be a double-party call or a multi-party call (e.g. teleconference), so that a user may acquire related data of the call content in the first time after the call or during the call, the search time is saved for the user, and call parties may timely learn the condition of related content and acquire beneficial information when a certain theme is discussed, e.g. a teleconference, thus contributing to the progress of the conference. In the above technical scheme, preferably, after the step of generating the recognition data, the method includes: extracting hot words and/or high-frequency words of which the appearance frequency reaches a preset frequency from the recognition data, to retrieve information correlated with the hot words and/or the high-frequency words. In this technical scheme, the hot words are current popular words, the high-frequency words are the ones of which the appearance frequency is high in the call, these words are most likely the theme or keywords of the current call content, and the query requirement of a user for the current call content may most likely be met by retrieving these words and acquiring the correlated information.

In the above technical scheme, preferably, the acquisition method of the hot words includes: comparing the words in the recognition data with words in a hot word bank, and extracting the same words therefrom to serve as the hot words.

In this technical scheme, the hot words may be acquired by comparing the words in the recognition data with the words in the hot word bank, wherein the hot word bank may be updated in real time.

In any above technical scheme, preferably, the step of extracting the high-frequency words further includes: comparing the high-frequency words with words in a preset word bank, and deleting the same words from the high-frequency words, to push the information correlated with the reserved high-frequency words.

In this technical scheme, besides the theme, the words with high appearance frequency in the call content may include modal particles, personal pronouns, conjunctions and the like, and these words are not the ones which need to be queried by a user. Thus, a preset word bank may be set for storing common or familiar words. After the high-frequency words in the call content are acquired, the high-frequency words are compared with the words in the preset word bank, and if the comparison result is identical, it indicates that the high-frequency words are common or familiar words, these common or familiar words are deleted from the high-frequency words, and only the remaining high-frequency words are retrieved, so that the retrieval workload may be reduced and the processing efficiency of a system may be improved. According to still yet another aspect of the present invention, also provided is an information pushing method, including: recognizing a voice of a call party during a call, generating recognition data and transmitting the recognition data to a server; and acquiring information correlated with the recognition data from the server.

In this technical scheme, a terminal may recognize the call voice and upload the recognized data to the server.

In the above technical scheme, preferably, when the recognition data is transmitted to the server, a recognition code of a call opposite party is transmitted to the server. According to a still further aspect of the present invention, also provided is an information pushing method, including: receiving recognition data from a terminal; and acquiring information correlated with the recognition data and pushing the information to the terminal.

In this technical scheme, a server is matched with the terminal and may recognize a call voice and acquire the correlated information according to the recognized data, wherein the call may be a double-party call or a multi-party call (e.g. teleconference), so that a user may acquire related data of the call content in the first time after the call or during the call, the search time is saved for the user, and call parties may timely learn the condition of related content and acquire beneficial information when a certain theme is discussed, e.g. a teleconference, thus contributing to the progress of the conference.

In the above technical scheme, preferably, the step of receiving the recognition data from the terminal further includes: extracting hot words and/or high-frequency words of which the appearance frequency reaches a preset frequency from the recognition data, to retrieve information correlated with the hot words and/or the high-frequency words.

In this technical scheme, the hot words are current popular words, the high-frequency words are the ones of which the appearance frequency is high in the call, these words are most likely the theme or keywords of the current call content, and the query requirement of a user for the current call content may most likely be met by retrieving these words and acquiring the correlated information.

In the above technical scheme, preferably, the acquisition method of the hot words includes: comparing the words in the recognition data with words in a hot word bank, and extracting the same words therefrom to serve as the hot words.

In this technical scheme, the hot words may be acquired by comparing the words in the recognition data with the words in the hot word bank, wherein the hot word bank may be updated in real time.

In the above technical scheme, preferably, the step of extracting the high-frequency words further includes: comparing the high-frequency words with words in a preset word bank, deleting the same words from the high-frequency words, and pushing the information correlated with the reserved high-frequency words.

In this technical scheme, besides the theme, the words with high appearance frequency in the call content may include modal particles, personal pronouns, conjunctions and the like, and these words are not the ones which need to be queried by a user. Thus, a preset word bank may be set for storing common or familiar words. After the high-frequency words in the call content are acquired, the high-frequency words are compared with the words in the preset word bank, and if the comparison result is identical, it indicates that the high-frequency words are common or familiar words, these common or familiar words are deleted from the high-frequency words, and only the remaining high-frequency words are retrieved, so that the retrieval workload may be reduced and the processing efficiency of a system may be improved. In any above technical scheme, preferably, the method further includes: receiving a recognition code of other terminal making a call with the terminal from the terminal; and when the recognition data respectively from the terminal and the other terminal is received, performing one-time retrieval to acquire the correlated information, and pushing the correlated information to the terminal and the other terminal.

In this technical scheme, because both the user terminal and the other terminal making a call with the user terminal may upload the recognition data to the server, the server needs to respectively retrieve the correlated information from the recognition data uploaded by the different terminals, actually, because the recognition data uploaded by the multiple terminals may be identical, only one-time retrieval is needed in this case, and then the retrieval result is respectively transmitted to the multiple terminals in the call, so that the workload of the server is reduced.

Thus, in order to reduce the computational burden of the server, the other terminal making a call with the user terminal may be determined by recognizing the recognition code transmitted by the user terminal, then the recognition data from the user terminal and the other terminal is retrieved only once, and the retrieval result is respectively transmitted to the user terminal and the other terminal.

Through the above technical schemes, information correlated with the theme may be automatically and rapidly acquired according to the call content and presented to a user, thus facilitating timely referring of the user and improving the user experience.

DETAILED DESCRIPTION OF THE EMBODIMENTS

To understand the above purposes, features and advantages of the present invention more clearly, the present invention will be further described in detail below in combination with the accompanying drawings and specific implementations. It should be noted that, the embodiments of the present application and the features in the embodiments may be combined with one another without conflicts.

Many specific details are described below for sufficiently understanding the present invention. However, the present invention may also be implemented by adopting other manners different from those described herein. Accordingly, the protection scope of the present invention is not limited to the specific embodiments disclosed below.

Figure 1:
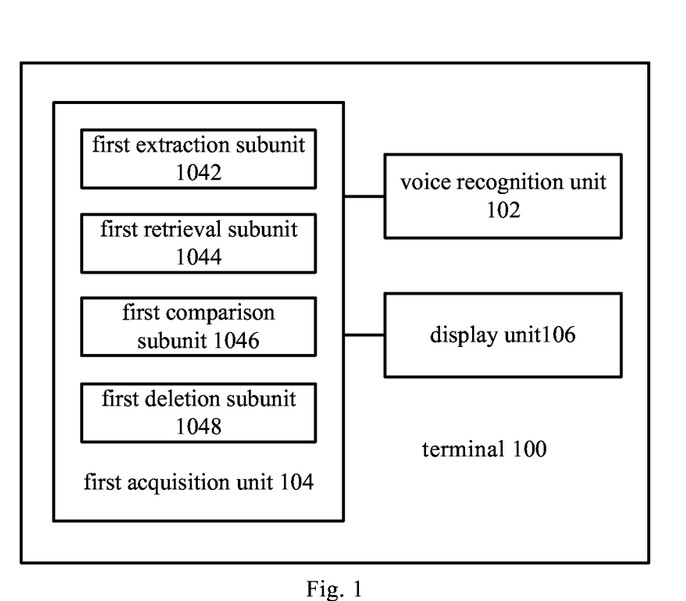
FIG. 1 shows a block diagram of a terminal according to an embodiment of the present invention.

FIG. 1 shows a block diagram of a terminal according to an embodiment of the present invention.

As shown in FIG. 1, the terminal 100 according to the embodiment of the present invention includes: a voice recognition unit 102 for recognizing a voice during a call and generating recognition data; a first acquisition unit 104 connected to the voice recognition unit 102 and used for acquiring information correlated with the recognition data; and a display unit 106 connected to the first acquisition unit 104 and used for displaying the correlated information.

Thus, the terminal 100 may recognize the call voice and acquire the correlated information according to the recognized data, wherein the call may be a double-party call or a multi-party call (e.g. teleconference), and the correlated information may be character or picture information correlated with the call content or a link. Therefore, a user may acquire related data of the call content in the first time after the call or during the call, the search time is saved for the user, and call parties may timely learn the condition of related content and acquire beneficial information when a certain theme is discussed, e.g. a teleconference, thus contributing to the progress of the conference.

Preferably, the first acquisition unit 104 may include: a first extraction subunit 1042 for extracting hot words and/or high-frequency words of which the appearance frequency reaches a preset frequency from the recognition data; and a first retrieval subunit 1044 for retrieving information correlated with the hot words and/or the high-frequency words.

In this technical scheme, the hot words are current popular words, the high-frequency words are the ones of which the appearance frequency is high in the call, these words are most likely the theme or keywords of the current call content, and the query requirement of a user for the current call content may most likely be met by retrieving these words and acquiring the correlated information.

Preferably, the first extraction subunit 1042 compares the words in the recognition data with words in a hot word bank, and extracts the same words therefrom to serve as the hot words.

Thus, the hot words may be acquired by comparing the words in the recognition data with the words in the hot word bank, wherein the hot word bank may be updated in real time.

Preferably, the first acquisition unit 104 may further include: a first comparison subunit 1046 for comparing the high-frequency words with words in a preset word bank; and a first deletion subunit 1048 for deleting the same words from the high-frequency words according to the comparison result of the first comparison subunit 1046, to push the information correlated with the reserved high-frequency words.

Besides the theme, the words with high appearance frequency in the call content may include modal particles, personal pronouns, conjunctions and the like, and these words are not the ones which need to be queried by a user. Thus, a preset word bank may be set for storing common or familiar words. After the high-frequency words in the call content are acquired, the high-frequency words are compared with the words in the preset word bank, and if the comparison result is identical, it indicates that the high-frequency words are common or familiar words, these common or familiar words are deleted from the high-frequency words, and only the remaining high-frequency words are retrieved, so that the retrieval workload may be reduced and the processing efficiency of a system may be improved.

Moreover, the terminal 100 may also recognize synonyms expressed in different expression manners in the call content according to the recognition data and perform further statistics. For example, the appearance frequencies of "NFC" and "near field communication" in the call content are relatively high, the meaning of NFC is Near Field Communication, then the terminal 100 may judge that "NFC" and "near field communication" are synonyms, and retrieval is performed only according to the "NFC" or "near field communication", so that misjudgment and repeated retrieval of the high-frequency words are avoided, the burden of a processor may be reduced likewise and the processing efficiency of the system is improved.

An embodiment of the terminal according to the present invention is introduced above, and another embodiment of the terminal according to the present invention will be introduced below.

Figure 2:
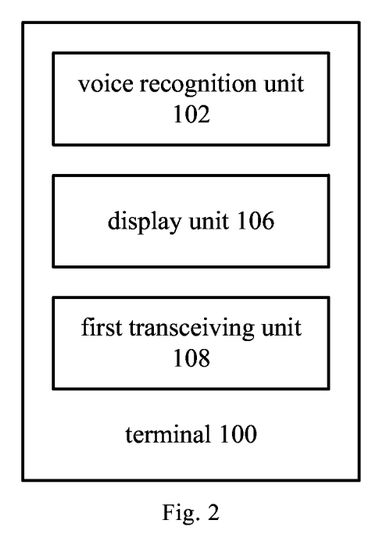
FIG. 2 shows a block diagram of a terminal according to another embodiment of the present invention.

FIG. 2 shows a block diagram of a terminal according to another embodiment of the present invention.

As shown in FIG. 2, the terminal 100 according to the embodiment of the present invention, includes: a voice recognition unit 102 for recognizing a voice during a call and generating recognition data; a first transceiving unit 108 connected to the voice recognition unit 102 and used for transmitting the recognition data to a server (e.g. a server shown in FIG. 3) and receiving information returned by the server; and a display unit 106 connected to the first transceiving unit 108 and used for displaying the information from the server. The terminal 100 in this embodiment may recognize the call voice and upload the recognized data to the server.

Preferably, the first transceiving unit 108 is also used for transmitting a recognition code of other terminal making a call with the terminal 100 to the server.

Figure 3:
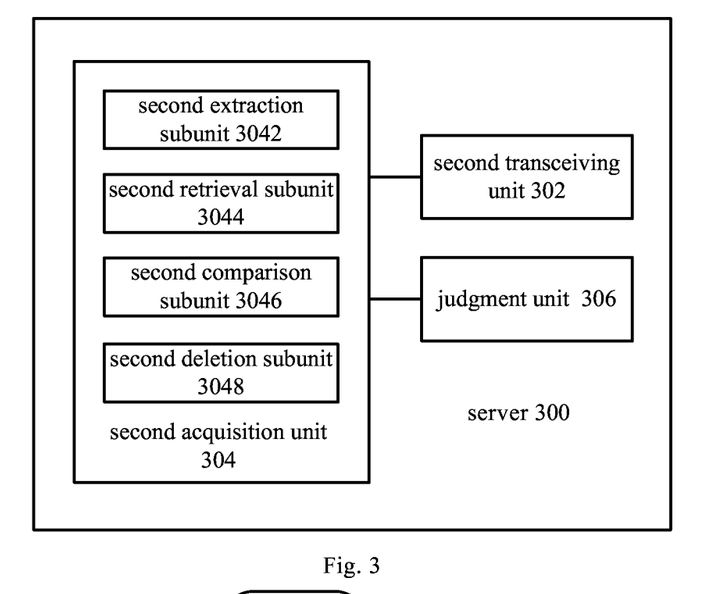
FIG. 3 shows a block diagram of a server according to an embodiment of the present invention.

It should be understood that, the terminal in each above embodiment includes, but not limited to, a mobile phone, portable mobile equipment or a tablet personal computer. FIG. 3 shows a block diagram of a server according to an embodiment of the present invention.

As shown in FIG. 3, the server 300 according to the embodiment of the present invention includes: a second transceiving unit 302 for receiving the recognition data transmitted by the terminal 100 for example shown in FIG. 2, and transmitting correlated information acquired by a second acquisition unit 304 to the terminal 100; and the second acquisition unit 304 connected to the second transceiving unit 302 and used for acquiring the information correlated with the recognition data.

In this technical scheme, the server 300 may be matched with the terminal 100 for example shown in FIG. 2 and may acquire the correlated information according to the recognition data of the terminal; the server 300 may be a cloud server; the call may be a double-party call or a multi-party call (e.g. teleconference); and the correlated information may be character or picture information correlated with the call content or a link. Therefore, a user may acquire related data of the call content in the first time after the call or during the call, thus saving the search time for the user.

Preferably, the second acquisition unit 304 includes a second extraction subunit 3042 connected to a second retrieval subunit 3044 and used for extracting hot words and/or high-frequency words of which the appearance frequency reaches a preset frequency from the recognition data; and the second retrieval subunit 3044 connected to the second transceiving unit 302 and used for retrieving information correlated with the hot words and/or the high-frequency words.

The hot words are current popular words, the high-frequency words are the ones of which the appearance frequency is high in the call, these words are most likely the theme or keywords of the current call content, and the query requirement of a user for the current call content may most likely be met by retrieving these words and acquiring the correlated information.

Preferably, the second extraction subunit 3042 compares the words in the recognition data with words in a hot word bank, and extracts the same words therefrom to serve as the hot words.

Thus, the hot words may be acquired by comparing the words in the recognition data with the words in the hot word bank, wherein the hot word bank may be updated in real time.

Preferably, the second acquisition unit 304 further includes: a second comparison subunit 3046 for comparing the high-frequency words with words in a preset word bank; and a second deletion subunit 3048 for deleting the same words from the high-frequency words according to the comparison result of the second comparison subunit 3046, to push the information correlated with the reserved high-frequency words.

Besides the theme, the words with high appearance frequency in the call content may include modal particles, personal pronouns, conjunctions and the like, and these words are not the ones which need to be queried by a user. Thus, a preset word bank may be set for storing common or familiar words. After the high-frequency words in the call content are acquired, the high-frequency words are compared with the words in the preset word bank, and if the comparison result is identical, it indicates that the high-frequency words are common or familiar words, these common or familiar words are deleted from the high-frequency words, and only the remaining high-frequency words are retrieved, so that the retrieval workload may be reduced and the processing efficiency of a system may be improved.

Moreover, the server 300 may also recognize synonyms expressed in different expression manners in the call content according to the recognition data and perform further statistics. For example, the appearance frequencies of "NFC" and "near field communication" in the call content are relatively high, the meaning of NFC is Near Field Communication, then the server 300 may judge that "NFC" and "near field communication" are synonyms, and retrieval is performed only according to the "NFC" or "near field communication", so that misjudgment and repeated retrieval of the high-frequency words are avoided, the burden of a processor may be reduced likewise and the processing efficiency of the system is improved.

Preferably, the second transceiving unit 302 is also used for receiving a recognition code of other terminal making a call with the terminal 100 as shown in FIG. 2 from the terminal 100, the server 300 further includes a judgment unit 306 for judging the other terminal making a call with the terminal 100 according to the recognition code transmitted by the terminal 100, and the second transceiving unit 302 transmits the correlated information to the other terminal.

Because both the user terminal 100 and the other terminal making a call with the user terminal 100 may upload the recognition data to the server 300, the server 300 needs to respectively retrieve the correlated information from the recognition data uploaded by the different terminals, actually, because the recognition data uploaded by the multiple terminals may be identical, only one-time retrieval is needed in this case, and then the retrieval result is respectively transmitted to the multiple terminals in the call, so that the workload of the server 300 is reduced.

Thus, in order to reduce the computational burden of the server 300, the other terminal making a call with the user terminal 100 may be determined by recognizing the recognition code transmitted by the user terminal 100, then the recognition data from the user terminal 100 and the other terminal is retrieved only once, and the retrieval result is respectively transmitted to the user terminal 100 and the other terminal.

Figure 4:
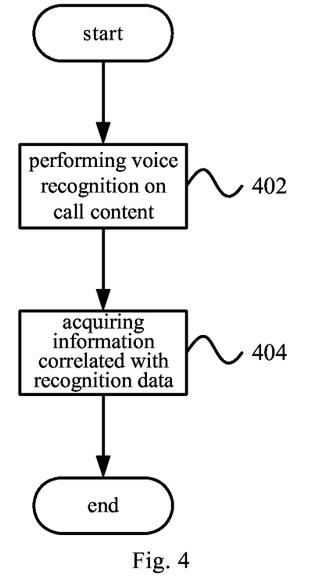
FIG. 4 shows a flow diagram of an information pushing method according to an embodiment of the present invention.

FIG. 4 shows a flow diagram of an information pushing method according to an embodiment of the present invention.

As shown in FIG. 4, the information pushing method according to the embodiment of the present invention includes: step 402, recognizing a voice during a call and generating recognition data; and step 404, acquiring information correlated with the recognition data and pushing the information to a user.

The above method may be applied to a terminal, the terminal includes, but not limited to, a mobile phone or a tablet personal computer, and the terminal may automatically recognize the call voice and acquire the correlated information according to the recognized data, wherein the terminal may be the terminal 100 as shown in FIG. 1; the call may be a double-party call or a multi-party call (e.g. teleconference), and the correlated information may be character or picture information correlated with the call content or a link. Therefore, a user may acquire related data of the call content in the first time after the call or during the call, the search time is saved for the user, and call parties may timely learn the condition of related content and acquire beneficial information when a certain theme is discussed, e.g. a teleconference, thus contributing to the progress of the conference.

Preferably, after step 402, the method includes: extracting hot words and/or high-frequency words of which the appearance frequency reaches a preset frequency from the recognition data, to retrieve information correlated with the hot words and/or the high-frequency words.

The hot words are current popular words, the high-frequency words are the ones of which the appearance frequency is high in the call, these words are most likely the theme or keywords of the current call content, and the query requirement of a user for the current call content may most likely be met by retrieving these words and acquiring the correlated information.

Preferably, the acquisition method of the hot words includes: comparing the words in the recognition data with words in a hot word bank, and extracting the same words therefrom to serve as the hot words.

Thus, the hot words may be acquired by comparing the words in the recognition data with the words in the hot word bank, wherein the hot word bank may be updated in real time.

Preferably, the method may further include: comparing the high-frequency words with words in a preset word bank, and deleting the same words from the high-frequency words, to push the information correlated with the reserved high-frequency words. Besides the theme, the words with high appearance frequency in the call content may include modal particles, personal pronouns, conjunctions and the like, and these words are not the ones which need to be queried by a user. Thus, a preset word bank may be set for storing common or familiar words. After the high-frequency words in the call content are acquired, the high-frequency words are compared with the words in the preset word bank, and if the comparison result is identical, it indicates that the high-frequency words are common or familiar words, these common or familiar words are deleted from the high-frequency words, and only the remaining high-frequency words are retrieved, so that the retrieval workload may be reduced and the processing efficiency of a system may be improved.

Moreover, the terminal may also recognize synonyms expressed in different expression manners in the call content according to the recognition data and perform further statistics. For example, the appearance frequencies of "NFC" and "near field communication" in the call content are relatively high, the meaning of NFC is Near Field Communication, then the terminal may judge that "NFC" and "near field communication" are synonyms, and retrieval is performed only according to the "NFC" or "near field communication", so that misjudgment and repeated retrieval of the high-frequency words are avoided, the burden of a processor may be reduced likewise and the processing efficiency of the system is improved.

Figure 5:
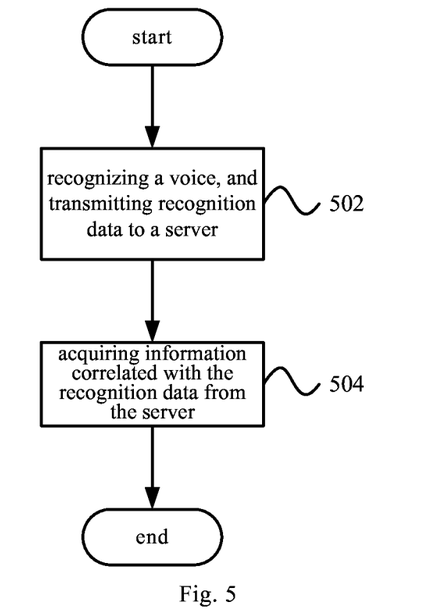
FIG. 5 shows a flow diagram of an information pushing method according to another embodiment of the present invention.

FIG. 5 shows a flow diagram of an information pushing method according to another embodiment of the present invention.

As shown in FIG. 5, the information pushing method according to the embodiment of the present invention includes: step 502, recognizing a voice during a call, generating recognition data and transmitting the recognition data to a server; and step 504, acquiring information correlated with the recognition data from the server.

The above method may be applied to a terminal, the terminal includes, but not limited to, a mobile phone or a tablet personal computer, and the terminal may recognize the call voice and upload the recognized data to the server, wherein the terminal may be the terminal 100 as shown in FIG. 2, the server may be the server 300 as shown in FIG. 3, and the information correlated with the recognition data is acquired by the server. Preferably, when the recognition data is transmitted to the server, a recognition code of a call opposite party is transmitted to the server, so that the server may determine a terminal making a call with the transmitting terminal.

Figure 6:
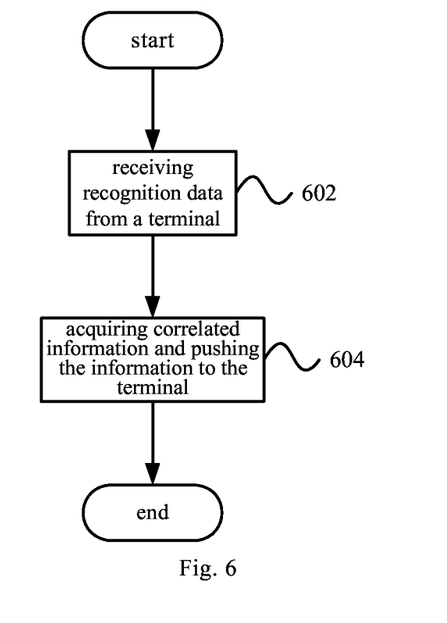
FIG. 6 shows a flow diagram of an information pushing method according to yet another embodiment of the present invention.

FIG. 6 shows a flow diagram of an information pushing method according to yet another embodiment of the present invention.

As shown in FIG. 6, the information pushing method according to the embodiment of the present invention includes: step 602, receiving recognition data from a terminal; and step 604, acquiring information correlated with the recognition data and pushing the information to the terminal.

The above method may be applied to a server, e.g. the server 300 shown in FIG. 3. The server is matched with the terminal and may acquire the correlated information according to the recognition data uploaded by the terminal, wherein the terminal may be the terminal 100 as shown in FIG. 2; the server 300 may be a cloud server; the call may be a double-party call or a multi-party call (e.g. teleconference), and the correlated information may be character or picture information correlated with the call content or a link. Therefore, a user may acquire related data of the call content in the first time after the call or during the call, the search time is saved for the user, and call parties may timely learn the condition of related content and acquire beneficial information when a certain theme is discussed, e.g. a teleconference, thus contributing to the progress of the conference.

Preferably, the method may further include: extracting hot words and/or high-frequency words of which the appearance frequency reaches a preset frequency from the recognition data, to retrieve information correlated with the hot words and/or the high-frequency words.

The hot words are current popular words, the high-frequency words are the ones of which the appearance frequency is high in the call, these words are most likely the theme or keywords of the current call content, and the query requirement of a user for the current call content may most likely be met by retrieving these words and acquiring the correlated information.

Preferably, the acquisition method of the hot words includes: comparing the words in the recognition data with words in a hot word bank, and extracting the same words therefrom to serve as the hot words.

Thus, the hot words may be acquired by comparing the words in the recognition data with the words in the hot word bank, wherein the hot word bank may be updated in real time.

Preferably, step 602 may further include: comparing the high-frequency words with words in a preset word bank, deleting the same words from the high-frequency words, and pushing the information correlated with the reserved high-frequency words. Besides the theme, the words with high appearance frequency in the call content may include modal particles, personal pronouns, conjunctions and the like, and these words are not the ones which need to be queried by a user. Thus, a preset word bank may be set for storing common or familiar words. After the high-frequency words in the call content are acquired, the high-frequency words are compared with the words in the preset word bank, and if the comparison result is identical, it indicates that the high-frequency words are common or familiar words, these common or familiar words are deleted from the high-frequency words, and only the remaining high-frequency words are retrieved, so that the retrieval workload may be reduced and the processing efficiency of a system may be improved.

Moreover, the server may also recognize synonyms expressed in different expression manners in the call content according to the recognition data and perform further statistics. For example, the appearance frequencies of "NFC" and "near field communication" in the call content are relatively high, the meaning of NFC is Near Field Communication, then the server may judge that "NFC" and "near field communication" are synonyms, and retrieval is performed only according to the "NFC" or "near field communication", so that misjudgment and repeated retrieval of the high-frequency words are avoided, the burden of a processor may be reduced likewise and the processing efficiency of the system is improved.

Preferably, the method may further include: receiving a recognition code of other terminal making a call with the terminal from the terminal; and when the recognition data respectively from the terminal and the other terminal is received, performing one-time retrieval to acquire the correlated information, and pushing the correlated information to the terminal and the other terminal.

In this technical scheme, because both the user terminal and the other terminal making a call with the user terminal may upload the recognition data to the server, the server needs to respectively retrieve the correlated information from the recognition data uploaded by the different terminals, actually, because the recognition data uploaded by the multiple terminals may be identical, only one-time retrieval is needed in this case, and then the retrieval result is respectively transmitted to the multiple terminals in the call, so that the workload of the server is reduced.

Thus, in order to reduce the computational burden of the server, the other terminal making a call with the user terminal may be determined by recognizing the recognition code transmitted by the user terminal 100, then the recognition data from the user terminal and the other terminal is retrieved only once, and the retrieval result is respectively transmitted to the user terminal and the other terminal.

Figure 7:
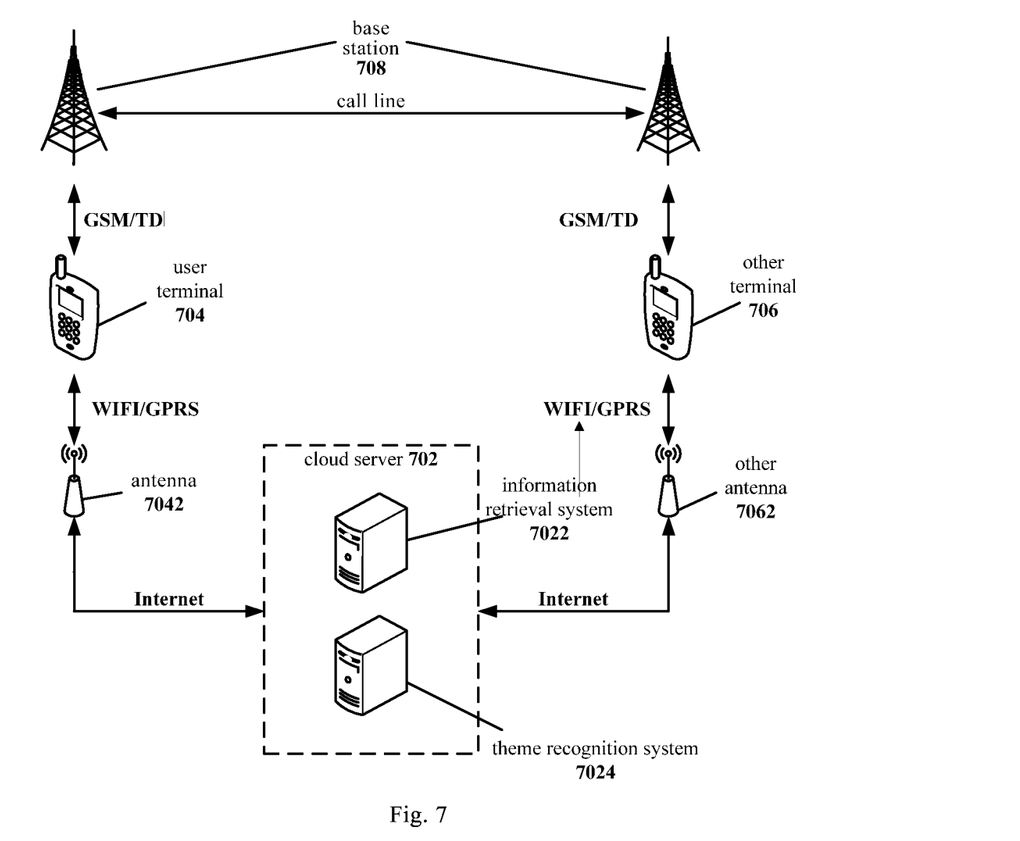
FIG. 7 shows a schematic diagram of an information pushing system according to an embodiment of the present invention.

FIG. 7 shows a schematic diagram of an information pushing system according to an embodiment of the present invention.

As shown in FIG. 7, a user terminal 704 makes a call with other terminal 706 through a base station 708, and meanwhile, the user terminal 704 and the other terminal 706 respectively perform voice recognition on the call content and generate recognition data.

If the user terminal 704 and the other terminal 706 themselves have the capability of acquiring correlated information according to the recognition data, they may extract hot words and/or high-frequency words of which the appearance frequency reaches a preset frequency from the recognition data and retrieve information correlated with the hot words and/or the high-frequency words only by themselves.

If the user terminal 704 and the other terminal 706 themselves do not have the capability of acquiring correlated information according to the recognition data, the terminal 704 and the other terminal 706 need to upload the recognition data to a cloud server 702 through an antenna 7402 and another antenna 7602 respectively, a theme recognition system 7024 (e.g. the second extraction subunit 3042 in FIG. 3) in the cloud server 702 extract hot words and/or high-frequency words of which the appearance frequency reaches a preset frequency from the recognition data, and an information retrieval system 7022 (e.g. the second retrieval subunit 3044 in FIG. 3) retrieves information correlated with the hot words and/or the high-frequency words. Of course, the user terminal 704 and the other terminal 706 may only have the capability of extracting hot words and/or high-frequency words of which the appearance frequency reaches a preset frequency according to the recognition data, then the extracted hot words and/or high-frequency words need to be uploaded to the cloud server 702, and the information retrieval system 7022 retrieves information correlated with the hot words and/or the high-frequency words.

Finally, the cloud server 702 transmits the retrieved correlated information to the user terminal 704 and the other terminal 706 respectively, thus facilitating referring of a user, avoiding a query operation of the user after the call, saving the time for the user and improving the user experience.

Figure 8A:
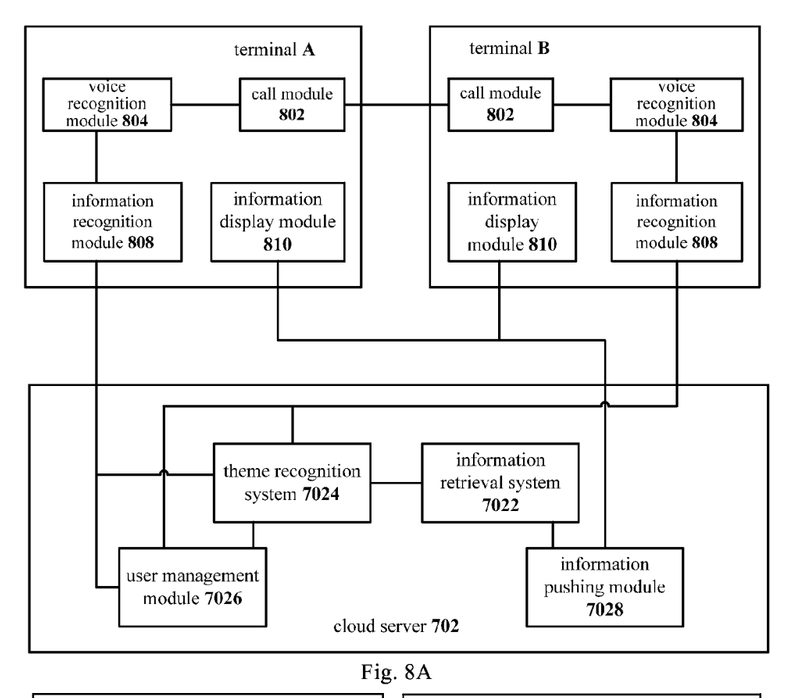
FIG. 8A and FIG. 8B show structural schematic diagrams of the information pushing system according to the embodiment of the present invention.
Figure 8B:
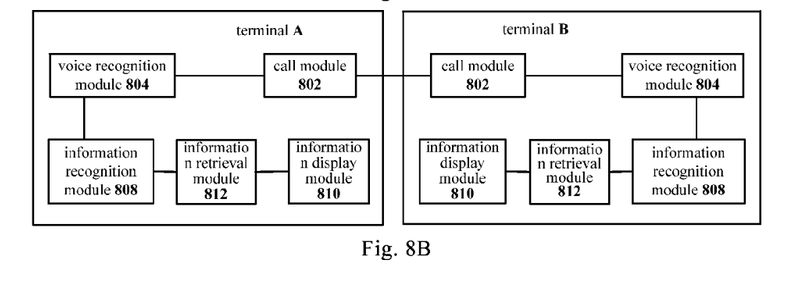

FIG. 8A and FIG. 8B show structural schematic diagrams of the information pushing system according to the embodiment of the present invention.

As shown in FIG. 8A, the double parties of a call are a terminal A and a terminal B, wherein the terminal A and the terminal B themselves do not have the capability of acquiring correlated information according to recognition data, specifically, the terminal A and the terminal B make a call through their respective call modules 802 respectively, their respective voice recognition modules 804 acquire the call content and recognize the voice respectively, their respective information recognition modules 808 generate recognition data (e.g. generate data files) respectively according to the recognized content and transmit the recognition data to the theme recognition system 7022 of the cloud server 702, the theme recognition system 7022 extracts hot words and/or high-frequency words of which the appearance frequency reaches a preset frequency from the recognition data and transmits the hot words and/or the high-frequency words to the information retrieval system 7022, the information retrieval system 7024 performs retrieval according to the hot words and/or the high-frequency words to acquire information correlated with the hot words and/or the high-frequency words and transmits the correlated information to an information pushing module 7028, and finally, the information pushing module 7028 respectively pushes the correlated information to respective information display modules 810 of the terminal A and the terminal A for displaying.

On the other hand, when the information recognition modules 808 upload the recognition data, the information recognition modules 808 transmit recognition codes of the terminal A and the terminal B to a user management module 7026 of the cloud server 702. The user management module 7026 analyzes the recognition codes, judges whether the terminal A and the terminal B are double parties of a call, and if so, controls the theme recognition system 7022 to extract hot words and/or high-frequency words only once from the recognition data respectively uploaded by the terminal A and the terminal B (namely extract hot words and/or high-frequency words from the recognition data uploaded by the terminal A or the terminal B), thus avoiding repetitive operation of the server and reducing the computational burden of the server.

As shown in FIG. 8B, the terminal A and the terminal B respectively have the capability of acquiring correlated information according to recognition data, specifically, the terminal A and the terminal B make a call through their respective call modules 802 respectively, their respective voice recognition modules 804 acquire the call content and recognizes the voice respectively, their respective information recognition modules 808 generate recognition data respectively according to the recognized content and transmit the recognition data to their respective information retrieval modules 812, the information retrieval modules 812 extract hot words and/or high-frequency words of which the appearance frequency reaches a preset frequency from the recognition data and perform retrieval according to the hot words and/or the high-frequency words to acquire information correlated with the hot words and/or the high-frequency words, and finally, the respective information display modules 810 of the terminal A and the terminal B respectively present the information to their respective users for referring.

By adopting the information pushing system, a user may conveniently refer to the hot words and/or the high-frequency words in the call content, so that the query operation is prevented from being executed by the user again after the call or during the call, the time is saved for the user, and the user experience is improved.

The technical schemes of the present invention are described in detail above in combination with the accompanying drawings. In related technologies, related information of the words of user's interest in the call content may be referred to by a fussy operation, so that the user experience is poor. Through the technical schemes of the present invention, information correlated with the theme may be automatically and rapidly acquired according to the call content and presented to a user, thus facilitating referring of the user and improving the user experience.

In the present invention, the term "first" or "second" is merely used for describing the purpose, and should not be understood as indicating or implying the relative importance. The term "multiple" indicates two or more, unless otherwise defined explicitly.

The foregoing descriptions are merely preferred embodiments of the present invention, rather than limiting the present invention. Various modifications and alterations may be made to the present invention for those skilled in the art. Any modification, equivalent substitution, improvement or the like made within the spirit and principle of the present invention shall fall into the protection scope of the present invention.

The invention claimed is:

1. A server, comprising:
a second transceiving unit for receiving the recognition data transmitted by a terminal, and transmitting correlated information acquired by a second acquisition unit to the terminal; and
the second acquisition unit, wherein the second acquisition unit is connected to the second transceiving unit and used for acquiring the information correlated with the recognition data, and wherein the second acquisition unit comprises:
a second comparison subunit for comparing high-frequency words with words in a preset word bank; and
a second deletion subunit for deleting the same words from the high-frequency words according to a comparison result of the second comparison subunit, to push the information correlated with the reserved high-frequency words,
wherein the terminal comprises:
a voice recognition unit for recognizing a voice during a call and generating recognition data;
a first transceiving unit connected to the voice recognition unit and used for transmitting the recognition data to the server and receiving information returned by the server; and
a display unit connected to the first transceiving unit and used for displaying the information from the server.

2. The server of claim 1, wherein the first transceiving unit is also used for transmitting a recognition code of other terminal making a call with the terminal to the server.

3. The server of claim 1, wherein the second acquisition unit comprises a second extraction subunit connected to a second retrieval subunit and used for extracting hot words and/or high-frequency words of which the appearance frequency reaches a preset frequency from the recognition data; and
the second retrieval subunit connected to the second transceiving unit and used for retrieving information correlated with the hot words and/or the high-frequency words.

4. The server of claim 3, wherein the second extraction subunit compares the words in the recognition data with words in a hot word bank, and extracts the same words therefrom to serve as the hot words.

5. The server of claim 4, wherein the second acquisition unit further comprises:
a second comparison subunit for comparing the high-frequency words with words in a preset word bank;
a second deletion subunit for deleting the same words from the high-frequency words according to the comparison result of the second comparison subunit, to push the information correlated with the reserved high-frequency words.

6. The server of claim 4, wherein the second transceiving unit is also used for receiving a recognition code of other terminal making a call with the terminal; and
the server further comprises a judgment unit for judging the other terminal making a call with the terminal according to the recognition code transmitted by the terminal, and the second transceiving unit transmits the correlated information to the other terminal.

7. The server of claim 3, wherein the second transceiving unit is also used for receiving a recognition code of other terminal making a call with the terminal; and
the server further comprises a judgment unit for judging the other terminal making a call with the terminal according to the recognition code transmitted by the terminal, and the second transceiving unit transmits the correlated information to the other terminal.

8. The server of claim 1, wherein the second transceiving unit is also used for receiving a recognition code of other terminal making a call with the terminal; and
the server further comprises a judgment unit for judging the other terminal making a call with the terminal according to the recognition code transmitted by the terminal, and the second transceiving unit transmits the correlated information to the other terminal.

9. An information pushing method, the method comprising:
receiving at a server recognition data from a terminal, wherein the receiving comprises extracting high-frequency words of which the appearance frequency reaches a preset frequency from the recognition data, and wherein the server comprises a transceiving unit for receiving the recognition data from the terminal and transmitting acquired information to the terminal;
acquiring with an acquisition unit of the server information correlated with the recognition data and pushing the information to the terminal; and
comparing with a comparison subunit of the acquisition unit high-frequency words with words in a preset word bank, deleting with a deletion subunit of the acquisition unit the same words from the high-frequency words, and pushing with the transceiving unit of the server information correlated with reserved high-frequency words to the terminal.

10. The information pushing method of claim 9, wherein the step of receiving the recognition data from the terminal further comprises: extracting hot words of which the appearance frequency reaches a preset frequency from the recognition data, to retrieve information correlated with the hot words.

11. The information pushing method of claim 10, wherein the acquisition method of the hot words comprises: comparing the words in the recognition data with words in a hot word bank, and extracting the same words therefrom to serve as the hot words.

12. The information pushing method of claim 10, further comprising:
receiving a recognition code of other terminal making a call with the terminal from the terminal; and
when the recognition data respectively from the terminal and the other terminal is received, performing one-time retrieval to acquire the correlated information, and pushing the correlated information to the terminal and the other terminal.

13. The information pushing method of claim 10, further comprising:
receiving a recognition code of other terminal making a call with the terminal from the terminal; and
when the recognition data respectively from the terminal and the other terminal is received, performing one-time retrieval to acquire the correlated information, and pushing the correlated information to the terminal and the other terminal.

14. The information pushing method of claim 9, further comprising:
receiving a recognition code of other terminal making a call with the terminal from the terminal; and
when the recognition data respectively from the terminal and the other terminal is received, performing one-time retrieval to acquire the correlated information, and pushing the correlated information to the terminal and the other terminal.

15. The information pushing method of claim 14, further comprising:
   judging with a judgment unit of the server the other terminal making a call with the terminal according to the recognition code transmitted by the terminal; and
   transmitting with the transceiving unit of the server the correlated information to the other terminal.

\* \* \* \* \*